United States Patent Office 3,637,600
Patented Jan. 25, 1972

3,637,600
POLYIMIDE-AMIDES FROM REDUCED
MALEOPIMARIC ACID
Walter H. Schuller and Ray V. Lawrence, Lake City,
Fla., assignors to the United States of America as represented by the Secretary of Agriculture
No Drawing. Filed Apr. 15, 1970, Ser. No. 28,944
Int. Cl. C08g 20/32
U.S. Cl. 260—78 TF                                3 Claims

ABSTRACT OF THE DISCLOSURE

This invention relates to the preparation of reduced maleopimaric acid from reduced fumaropimaric acid, the preparation of the acid chloride of reduced maleopimaric acid, and the reaction of the acid chloride with diamines to give polyimide-amides, useful for the preparation of films.

---

A non-exclusive irrevocable, royalty-free license in the invention herein described, throughout the world for all purposes of the United States Government, with the power to grant sublicenses for such purposes, is hereby granted to the Government of the United States of America.

This invention relates to the preparation of reduced maleopimaric acid (2) from reduced fumaropimaric acid (1), the preparation of the acid chloride (3) of reduced maleopimaric acid, and the reaction of the acid chloride (3) with diamines to give new polyimide-amides (4), useful as film formers.

Maleopimaric acid has *not* been reported in the literature as having been reduced directly, e.g.

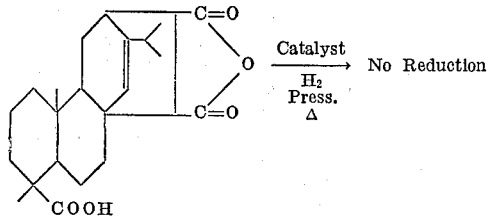

All attempts by the present inventors to carry out this direct reduction of maleopimaric acid to reduced maleopimaric acid, failed. Pressures up to 367 atmospheres of hydrogen at 250° C. employing noble metal catalysts failed to reduce the double bond. Even when equal weights of catalyst and maleopimaric acid were used, no reduction of the double bond took place. Thus, in order to prepare the new compound, hydrogenated maleopimaric acid, a new route had to be established. This was based on the thermal conversion of fumaropimaric acid to maleopimaric acid at 200° C. [N. J. Halbrook and R. V. Lawrence, J. Am. Chem. Soc., 80, 368 (1958)]. Thus hydrogenated fumaropimaric acid (1) [N. J. Halbrook and R. V. Lawrence, J. Am. Chem. Soc., 80, 368 (1958)] was prepared and after considerable experimentation it was found that it could be converted to reduced maleopimaric acid at about 285° C. in a bomb tube, preferably in the presence of a small amount of hydrochloric acid as a catalyst. Temperatures in the range of 250° C.–325° C. can be used with temperatures around 275–300° C.

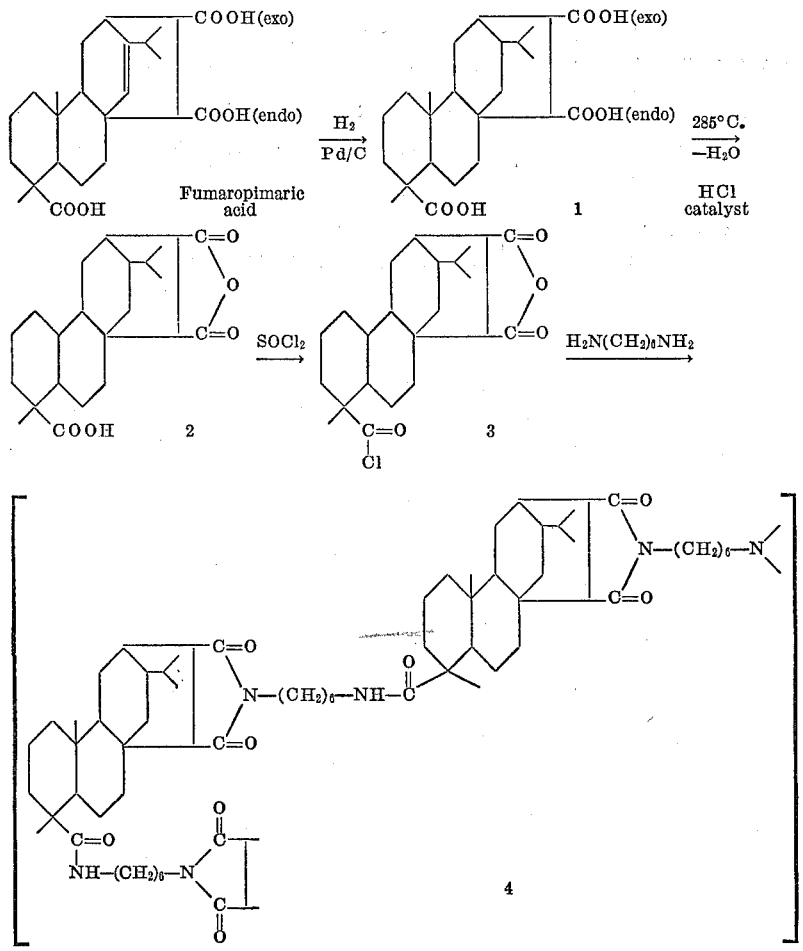

being preferred. In spite of the above mentioned work by Halbrook and Lawrence, this was a totally unexpected result and one that could not have been predicted or discovered without laboratory experimentation.

Reaction of the reduced maleopimaric acid with thionyl chloride gave the acid chloride (3). An excess of thionyl chloride was used as the solvent in the reaction. Completeness of the reaction was generally assured by allowing the solution to stand overnight at room temperature.

The polyimide-amide is prepared by heating equimolar amounts of the acid chloride of reduced maleopimaric acid with a diamine, such as 1,6-hexanediamine, to 320° C. in an open vessel while passing a stream of nitrogen through the flux to help remove hydrogen chloride gas and water, as they are formed. The heating period can be varied from 2 to 5 minutes with the usual reaction time at 320° C. being about 2.5–3.5 minutes.

The polyimide-amides so formed are high melting solids, insoluble in most solvents but soluble in chloroform. Films can be cast from chloroform solution. The addition of a small amount of plasticizer such as dioctyl phthalate improves the appearance and properties of the films. These films exhibit good water stability.

A related patent application was filed on Dec. 2, 1966 by the same inventors (Ser. No. 599,346) concerning the preparation of polyimide-amides from the acid chloride of maleopimaric acid and diamines. However, on heating, these polyimide-amides would be expected to break down due to a reversible Diels-Alder reaction of the maleopimaric acid moiety. By reducing the double bond of the maleopimaric acid, the reverse Diels-Alder reaction is prevented and a more thermostable polyimide-amide is obtained. This is shown by an examination of the thermogravimetric analyses (TGA) of the polyimide-amide prepared from reduced maleopimaric acid.

EXAMPLE 1

Reduced fumaropimaric acid (1.0 g.) [N. J. Halbrook and R. V. Lawrence, J. Am. Chem. Soc., 80, 368 (1958)] is charged to a Pyrex glass Carius bomb tube (20 cm. long and 1.5 cm. I.D.), 0.2 ml. of concentrated hydrochloric acid is added, the tube is swept with nitrogen and is sealed. The tube is placed in a wire screen cage and submerged in an oil bath and is heated at 280–290° C. for 30 minutes. The tube is cooled, opened, and the glassy solid reduced maleopimaric acid removed, powdered, and is washed with water until neutral on a Buchner funnel; $[\alpha]_D^{25}$ +16° (C, 1.4 in 95% ethanol), $[\alpha]_D^{25}$ +19.3 (C, 0.96 in chloroform); infrared absorption spectrum $\lambda_{max}$ (Nujol mull) 5.40 (m.), 5.65 (s.), 5.93 (s.) (cyclic 5-membered ring anhydride), also carboxyl bands on each side of methylene band at 3.5$\mu$.

EXAMPLE 2

Reduced fumaropimaric acid (0.4 g.) is heated in an open test tube in an oil bath at 280–290° C. for 30 minutes. The reduced maleopimaric acid exhibits $[\alpha]_D^{25}$ +12.4° (C, 1.88 in 95% ethanol); infrared absorption spectrum $\lambda_{max}$ (Nujol mull) 5.40 (m.), 5.63 (s.), 5.62 (s.) (cyclic 5-membered ring anhydride), also carboxyl bands on each side of methylene band at 3.5$\mu$.

EXAMPLE 3

The reduced maleopimaric acid from Example 1 (2.10 g.) is dissolved in 13 ml. of thionyl chloride. The mixture foams and much sulfur dioxide and hydrogen chloride gas are liberated as the solid dissolves. The solution is allowed to stand overnight at room temperature to insure completeness of conversion to the acid chloride. [See conversion of maleopimaric acid of maleopimaric acid chloride: W. H. Schuller and R. V. Lawrence, J. Chem. Eng. Data, 12, 267 (1967).] The excess reagent is then stripped off under reduced pressure and the residual black powdery reduced maleopimaric acid chloride is used immediately in subsequent reactions.

EXAMPLE 4

A 1:1 molar mixture of 2.60 g. (0.00618 mole) of reduced maleopimaric acid chloride from Example 3 and 1.225 g. (0.00618 mole) of 4,4'-methylenedianiline

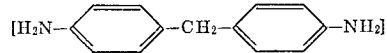

are mixed together thoroughly and are heated together in an open test tube over a Bunsen burner flame to 320° C. for 3 minutes. A thermometer is immersed in the flux during this period as well as a capillary tube through which is passed a fairly rapid stream of nitrogen. This nitrogen stream helps to carry off the hydrogen chloride and water of reaction as they are formed. [This general procedure is described for the reaction of maleopimaric acid chloride and diamines in the publication by W. H. Schuller, R. V. Lawrence, and B. M. Culbertson, J. Polymer Sci.: Part A–1, 5, 2204 (1967).] The product is a black solid and exhibits a capillary M.P. 392° C.; infrared absorption spectrum $\lambda_{max}$ (Nujol mull) 3.0$\mu$ (w.) (amide), 5.65 (m.) (imide), 5.88 (s.) imide, 6.07 (m.) (amide), 6.63 (m.) (amide), 13.92 (m.) (imide).

*Analysis.*—Calcd. (percent): N, 4.98. Found (percent): 5.18.

The polyimide-amide is insoluble in dimethylformamide, dimethyl sulfoxide, acetone, pentane, ethyl alcohol, water, concentrated acid and alkali, ethyl acetate, acetonitrile, glacial acetic acid, dioxane, benzene, carbon tetrachloride; soluble in chloroform. A film cast from chloroform has a Sward rocker hardness of 52. Thermal gravimetric analyses (TGA) of the sample of polyimide-amide indicates a 10% loss of weight at 390° C. and a 25% loss of weight at 460° C. in air; a 10% loss of weight at 360° C. and a 25% loss of weight at 415° C. is exhibited in nitrogen.

EXAMPLE 5

An intimate 1:1 molar mixture of 2.20 g. (0.00523 mole) of the acid chloride of reduced maleopimaric acid and 0.608 g. (0.00523 mole) of recrystallized and vacuum dried 1,6-hexanediamine

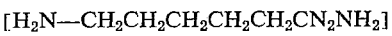

is charged to a test tube equipped with a thermometer and capillary tube carrying a stream of nitrogen as described in Example 4. The mixture is heated, under the nitrogen stream at 320° C. for 3 minutes. The hard glassy solid is soluble in chloroform; insoluble in acetone, ethyl acetate, pentane, ethyl alcohol, water, acetonitrile, glacial acetic acid, dioxane, concentrated acid and alkali, benzene, carbon tetrachloride.

*Analysis.*—Calcd. (percent): N, 5.79. Found (percent): N, 5.67.

Infrared absorption spectrum, $\lambda_{max}$ (Nujol mull) 3.0 (m.) (amide), 5.68 (m.) (imide), 5.95 (s.) (imide), 6.1 (m.) (shoulder) (amide), 6.65 (m.) (amide), 13.95 (m.) (imide)$\mu$.

Films are cast from chloroform; Sward rocker hardness 20; film exhibited good water resistance. To a solution of the polyimide-amide in chloroform is added a small amount of dioctyl phthalate as a plasticizer. This resulted in a softer film; Sward rocker hardness 12; this film also exhibits good water resistance.

We claim:
1. A process for preparing a film-forming polyimide-amide, which process comprises:
 (a) reacting hydrogenated maleopimaric acid with thionyl chloride to give the corresponding acid chloride,
 (b) heating equimolar amounts of the acid chloride from (a) with a diamine selected from the group consisting of 1,6-hexanediamine and 4,4'-methylenedianiline, in an open vessel at a temperature of about 320° C. while passing a stream of nitrogen through the flux.

2. A film-forming polyimide-polyamide resin wherein the repeating units consist of

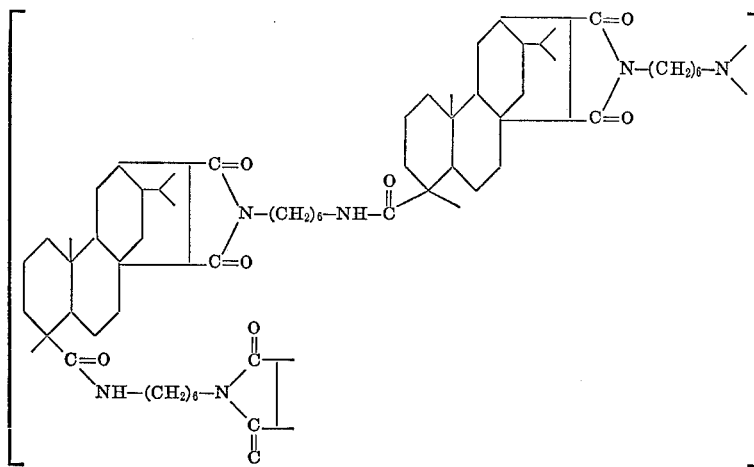

3. A film-forming polyimide-polyamide resin wherein the repeating units consist of

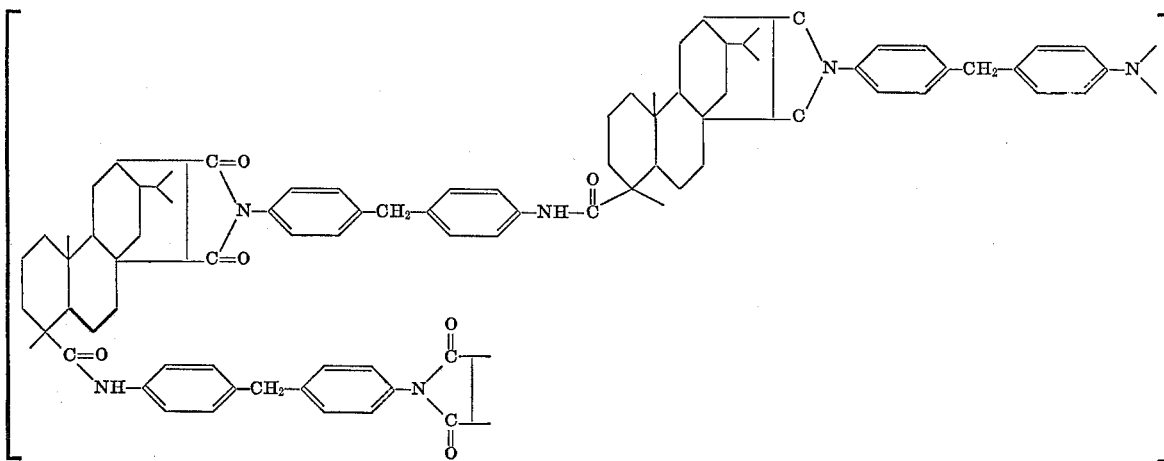

References Cited
UNITED STATES PATENTS

| | | | |
|---|---|---|---|
| 3,554,982 | 1/1971 | Aldrich | 260—78 |
| 3,522,211 | 7/1970 | Schuller et al. | 260—78 X |

OTHER REFERENCES

J. Polymer Science, part A–1, 5, pp. 2204–2207, 1967, Schuller et al.

HOWARD E. SCHAIN, Primary Examiner

U.S. Cl. X.R.

260—30.4 N, 33.8 R, 546